(12) United States Patent
Chen et al.

(10) Patent No.: US 10,464,524 B2
(45) Date of Patent: Nov. 5, 2019

(54) ALARMING AND UNLOCKING DEVICE

(71) Applicant: CRRC QINGDAO SIFANG CO., LTD., Shandong (CN)

(72) Inventors: Bo Chen, Qingdao (CN); Xiaojie Yu, Qingdao (CN); Lijun Ma, Qingdao (CN); Qing Tian, Qingdao (CN); Huiqing Zhang, Qingdao (CN); Qingjun Han, Qingdao (CN); Xin Jiang, Qingdao (CN); Jianying Liang, Qingdao (CN)

(73) Assignee: CRRC QINGDAO SIFANG CO., LTD., Qingdao (CN)

( * ) Notice: Subject to any disclaimer, the term of this patent is extended or adjusted under 35 U.S.C. 154(b) by 0 days.

(21) Appl. No.: 16/070,074

(22) PCT Filed: Dec. 5, 2016

(86) PCT No.: PCT/CN2016/108574
§ 371 (c)(1),
(2) Date: Jul. 13, 2018

(87) PCT Pub. No.: WO2017/166850
PCT Pub. Date: Oct. 5, 2017

(65) Prior Publication Data
US 2019/0023222 A1    Jan. 24, 2019

(30) Foreign Application Priority Data

Mar. 31, 2016  (CN) .......................... 2016 1 0202362

(51) Int. Cl.
*B60R 25/10*    (2013.01)
(52) U.S. Cl.
CPC ...... *B60R 25/1003* (2013.01); *B60R 25/1001* (2013.01); *B60R 2025/1013* (2013.01)

(58) Field of Classification Search
CPC . B60R 21/1003; B60R 21/1001; E05B 79/22; H01H 3/36; H01H 19/46
(Continued)

(56) References Cited

U.S. PATENT DOCUMENTS

| 4,450,545 A | * | 5/1984 | Kishi | ................. | G07C 9/00563 |
| | | | | | 307/117 |
| 5,148,468 A | | 9/1992 | Marrick | | |

(Continued)

FOREIGN PATENT DOCUMENTS

| CN | 201414161 Y | 2/2010 |
| CN | 201457414 U | 5/2010 |

(Continued)

OTHER PUBLICATIONS

International Search Report for corresponding application PCT/CN2016/108574 filed on Dec. 5, 2016; dated Feb. 9, 2017.

*Primary Examiner* — Omar Casillashernandez
(74) *Attorney, Agent, or Firm* — Cantor Colburn LLP (57) ABSTRACT

Disclosed is an alarming and unlocking device. The alarming and unlocking device is installed in a passenger carriage and includes a control switch (10), a communication device, and a locking device, wherein the control switch (10) is provided with an alarming position (11) and an unlocking position (12); the control switch (10) is in signal connection with the communication device; when the control switch (10) is located at the alarming position (11), the communication device is started to receive and send a voice signal; the locking device is installed on a door so as to control the door to lock or unlock; the control switch (10) is in signal connection with the locking device; and when the control switch (10) is located at the unlocking position (12), the locking device performs an unlocking operation. According to the alarming and unlocking device, the problem that a (Continued)

structure for an alarming and unlocking device on a vehicle is relatively complex in the conventional art is solved.

19 Claims, 5 Drawing Sheets

(58) Field of Classification Search
 USPC .................................................. 340/426.23
 See application file for complete search history.

(56) References Cited

U.S. PATENT DOCUMENTS

| | | | | |
|---|---|---|---|---|
| 6,060,979 | A * | 5/2000 | Eichsteadt | H04M 11/04 340/287 |
| 2003/0013503 | A1* | 1/2003 | Menard | H04M 1/0291 455/569.2 |
| 2007/0046780 | A1* | 3/2007 | Johnston | G07C 9/00166 348/152 |
| 2008/0196936 | A1* | 8/2008 | Yamamoto | H01R 25/006 174/520 |
| 2009/0302995 | A1* | 12/2009 | Park | E05B 47/0012 340/3.1 |
| 2011/0155516 | A1 | 6/2011 | Mason | |
| 2014/0118109 | A1* | 5/2014 | Plummer | G07C 9/00134 340/5.53 |
| 2016/0196703 | A1* | 7/2016 | Jean | H04N 7/186 340/5.53 |
| 2017/0064261 | A1* | 3/2017 | Peng | H04N 7/186 |
| 2017/0088099 | A1* | 3/2017 | Ma | G07C 9/00309 |
| 2019/0023222 | A1* | 1/2019 | Chen | B60R 25/1001 |

FOREIGN PATENT DOCUMENTS

| | | |
|---|---|---|
| CN | 204110849 U | 1/2015 |
| CN | 205071105 U | 3/2016 |
| CN | 105826119 A | 8/2016 |

* cited by examiner

ALARMING AND UNLOCKING DEVICE

TECHNICAL FIELD

The disclosure relates to the alarming and unlocking field of vehicles, and more particularly, to an alarming and unlocking device.

BACKGROUND

At present, in a metro vehicle project, each side of every passenger carriage is provided with four doors. The four doors are respectively provided with an emergency unlocking device and an emergency alarming device aside, all of which are to alarm under an emergency situation.

However, such design with relatively same functions not only occupies the resources, but also increases the difficulty in arranging an interface for equipment in the carriage overall. Moreover, the user experience of a passenger cannot be improved.

SUMMARY

The disclosure is mainly intended to provide an alarming and unlocking device, so as to solve the problem that a structure for an alarming and unlocking device on a vehicle is relatively complex in the prior art.

To this end, the disclosure provides an alarming and unlocking device. The alarming and unlocking device is installed in a passenger carriage and includes a control switch, a communication device, and a locking device, wherein the control switch is provided with an alarming position and an unlocking position; the control switch is in signal connection with the communication device; when the control switch is located at the alarming position, the communication device is started to receive and send a voice signal; the locking device is installed on a door so as to control the door to lock or unlock; the control switch is in signal connection with the locking device; and when the control switch is located at the unlocking position, the locking device performs an unlocking operation.

Further, the communication device includes a loudspeaker; the control switch is connected with the loudspeaker; when the control switch is located at the alarming position, the loudspeaker is started.

Further, the communication device further includes a microphone; the control switch is connected with the microphone; when the control switch is located at the alarming position, the microphone is started.

Further, the control switch includes a rotary knob; the rotary knob is moved rotationally to reach to the alarming position or the unlocking position.

Further, the control switch is further provided with a reset position; the alarming position is located between the reset position and the unlocking position.

Further, the alarming and unlocking device further includes a magnetic induction switch configured to send an alarming signal; the control switch includes magnetic steel configured to trigger the magnetic induction switch; after the magnetic steel triggers the magnetic induction switch, a circuit where the magnetic induction switch is located transfers the alarming signal to a driver's cab.

Further, the control switch further includes a wire drawing tray component; the magnetic steel is arranged on the wire drawing tray component; the rotary knob is connected with the wire drawing tray component so as to drive the wire drawing tray component to rotate; when the rotary knob is rotated to the alarming position, the magnetic steel triggers the magnetic induction switch.

Further, the alarming and unlocking device further includes a driving rope; the wire drawing tray component and the locking device are connected via the driving rope; when the rotary knob is rotated to the unlocking position, the driving rope drives the locking device to perform the unlocking operation.

Further, the alarming and unlocking device further includes a power control module; the power control module is connected with the communication device and is configured to supply a power to the communication device.

Further, the alarming and unlocking device further includes an indication device; the control switch is in signal connection with the indication device; when the control switch is located at the alarming position, the indication device sends out an alarming indication.

Further, a time relay is arranged in the locking device; a set period of time is stored in the time relay; when the control switch is located at the alarming position till the set period of time, the locking device generates a door unlocking confirmation signal and sends the door unlocking confirmation signal to the driver's cab.

In the disclosure, the alarming and unlocking device is installed in the passenger carriage and includes the control switch, the communication device and the locking device. Since the control switch includes the alarming position and the unlocking position, the communication device is started to receive and send the voice signal when the control switch is located at the alarming position and the locking device performs the unlocking operation when the control switch is located at the unlocking position. In this way, the alarming and the unlocking may be implemented by using one control switch, and the problem that the structure for the alarming and unlocking device on the vehicle is relatively complex in the prior art is solved.

BRIEF DESCRIPTION OF THE DRAWINGS

The accompanying drawings are described here to provide a further understanding of the disclosure, and form a part of the disclosure. The schematic embodiments and description of the disclosure are adopted to explain the disclosure, and do not form improper limits to the disclosure. In the drawings.

REFERENCE NUMBERS IN THE DRAWINGS

10. control switch; 11. alarming position; 12. unlocking position; 13. reset position; 14. rotary knob; 15. magnetic steel; 16. wire drawing tray component; 20. loudspeaker; 30. microphone; 40. magnetic induction switch; 50. driving rope; 60. power control module; 70. indication device; 80. data and power interface; 91. door; 92. locking device.

DETAILED DESCRIPTION OF THE EMBODIMENTS

It should be noted that the embodiments of the disclosure and the characteristics of the embodiments may be combined with each other if there is no conflict. The disclosure will be described below with reference to the drawings and embodiments in detail.

The embodiment provides an alarming and unlocking device. The alarming and unlocking device is installed in a passenger carriage. Please referring to FIG. 1 to FIG. 4, the alarming and unlocking device includes a control switch 10, a communication device, and a locking device 92, wherein the control switch 10 is provided with an alarming position 11 and an unlocking position 12; the control switch 10 is in signal connection with the communication device; when the control switch 10 is located at the alarming position 11, the communication device is started to receive and send a voice signal; the locking device 92 is installed on a door 91 so as to control the door 91 to lock or unlock; the control switch 10 is in signal connection with the locking device 92; when the control switch 10 is located at the unlocking position 12, the locking device 92 performs an unlocking operation.

In the embodiment, the alarming and unlocking device is installed in the passenger carriage and includes the control switch 10, the communication device and the locking device 92. Since the control switch 10 includes the alarming position and the unlocking position, the communication device is started to receive and send the voice signal when the control switch 10 is located at the alarming position and the locking device 92 performs the unlocking operation when the control switch 10 is located at the unlocking position. In this way, the alarming and the unlocking may be implemented by using one control switch 10, and the problem that the structure for the alarming and unlocking device on the vehicle is relatively complex in the prior art is solved.

In order to enable a passenger in the passenger carriage to hear a sound of a driver in a driver's cab, as shown in FIG. 1 to FIG. 4, the communication device includes a loudspeaker 20; the control switch 10 is connected with the loudspeaker 20; when the control switch 10 is located at the alarming position 11, the loudspeaker 20 is started.

In order to enable the passenger in the passenger carriage to notify the driver in the driver's cab of a situation, as shown in FIG. 1 to FIG. 4, the communication device further includes a microphone 30; the control switch 10 is connected with the microphone 30; when the control switch 10 is located at the alarming position 11, the microphone 30 is started.

Specifically, as shown in FIG. 1 to FIG. 4, the control switch 10 includes a rotary knob 14; the rotary knob 14 is moved rotationally to reach to the alarming position 11 or the unlocking position 12. In the embodiment, the control switch 10 is a rotary knob type switch and may reach to the alarming position 11 and the unlocking position 12 conveniently.

In order to implement the reset of the control switch 10, the control switch 10 is further provided with a reset position 13; the alarming position 11 is located between the reset position 13 and the unlocking position 12.

Figure 1:
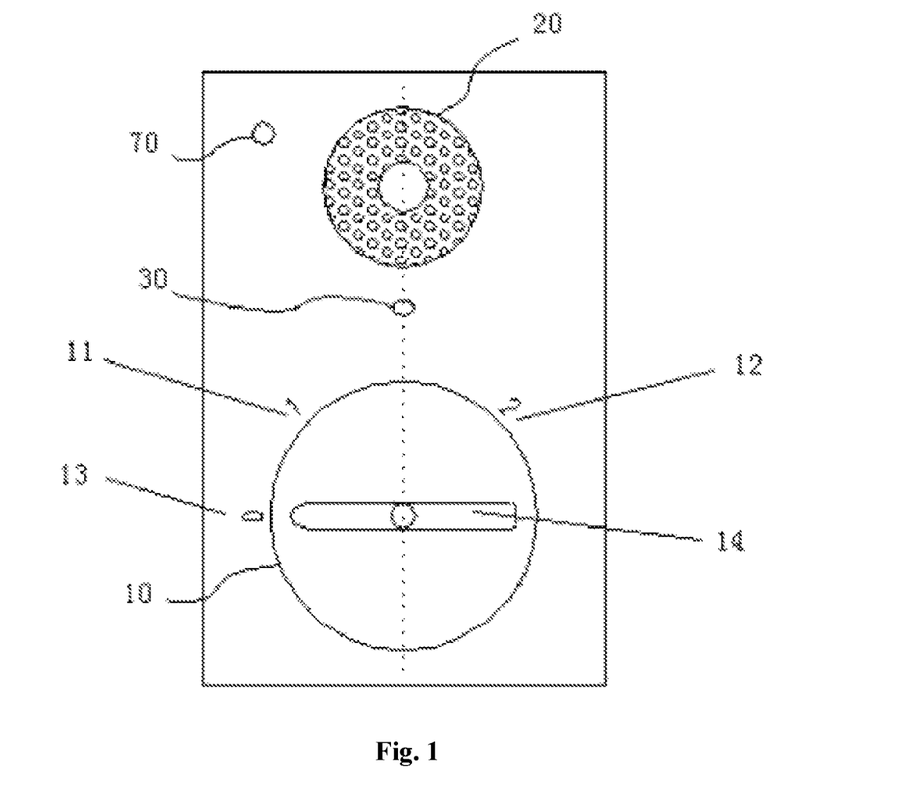
FIG. 1 is a structural schematic diagram of an embodiment of an alarming and unlocking device according to the disclosure.
Figure 2:
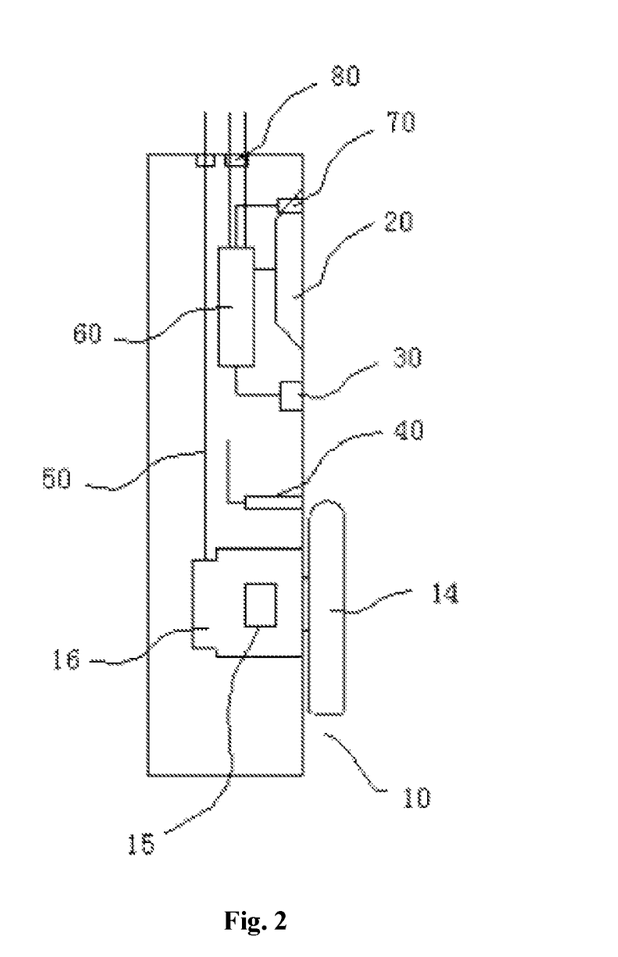
FIG. 2 is a side view of an alarming and unlocking device in FIG. 1.

In the embodiment, as shown in FIG. 2, the alarming and unlocking device further includes a magnetic induction switch 40 configured to send an alarming signal; the control switch 10 includes magnetic steel 15 configured to trigger the magnetic induction switch 40; after the magnetic steel 15 triggers the magnetic induction switch 40, a circuit where the magnetic induction switch 40 is located transfers the alarming signal to the driver's cab.

When the passenger screws the rotary knob 14 to the alarming position 11, the magnetic induction switch 40 is triggered to generate the alarming signal and the circuit where the magnetic induction switch 40 is located transfers the alarming signal to the driver's cab. After reception of the alarming signal, the driver confirms to unlock and an unlocking signal may be sent to the locking device 92 to unlock the door 91. Or, the driver agrees to unlock the passenger carriage. At this moment, the passenger may screw the rotary knob 14 to the unlocking position, the control switch 10 sends an unlocking signal to the locking device 92 and the locking device 92 unlocks the door 91.

If an emergency stop is required in an emergency situation, the passenger can rotate the rotary knob on the device to the alarming position without loosening a hand. After the passenger communicates with the driver to confirm and if the driver considers that the emergency situation at this time needs the emergency stop, the emergency stop is adopted and a confirmation signal is sent. At this moment, the passenger may continue to rotate the switch to the unlocking position of the door, thereby implementing the unlocking function of the door. The door may be opened artificially.

In order to implement the triggering of the magnetic induction switch 40, as shown in FIG. 2, the control switch 10 further includes a wire drawing tray component 16; the magnetic steel 15 is arranged on the wire drawing tray component 16; the rotary knob 14 is connected with the wire drawing tray component 16 so as to drive the wire drawing tray component 16 to rotate; when the rotary knob 14 is rotated to the alarming position 11, the magnetic steel 15 triggers the magnetic induction switch 40. Preferably, a row of small magnetic steels are installed on the wire drawing tray component 16 so as to provide a magnetic field to trigger the magnetic induction switch.

In the embodiment, a connection manner between the control switch 10 and the locking device is as follows: as shown in FIG. 2, the alarming and unlocking device further includes a driving rope 50; the wire drawing tray component 16 and the locking device are connected via the driving rope 50; when the rotary knob 14 is rotated to the unlocking position 12, the driving rope 50 drives the locking device to perform the unlocking operation.

Figure 3:
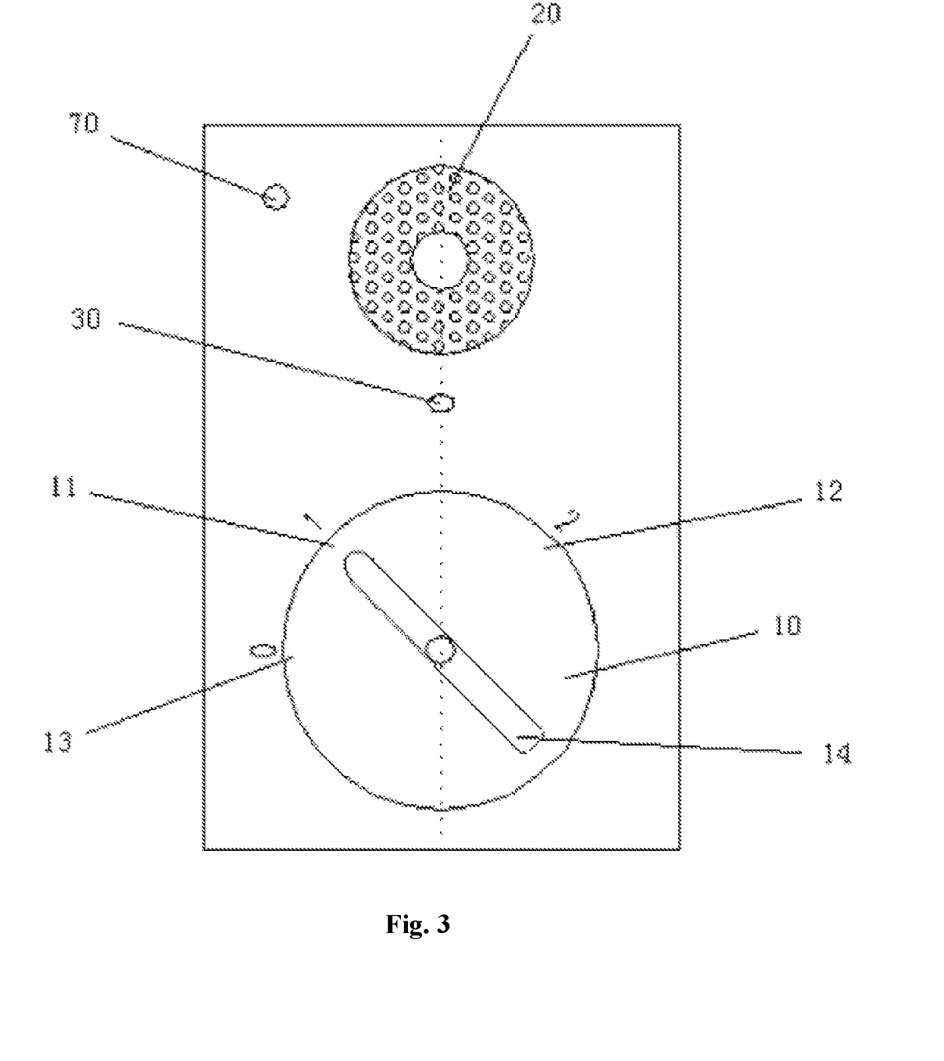
FIG. 3 is a state diagram when a control switch of an alarming and unlocking device in FIG. 1 is located at an alarming position.
Figure 4:
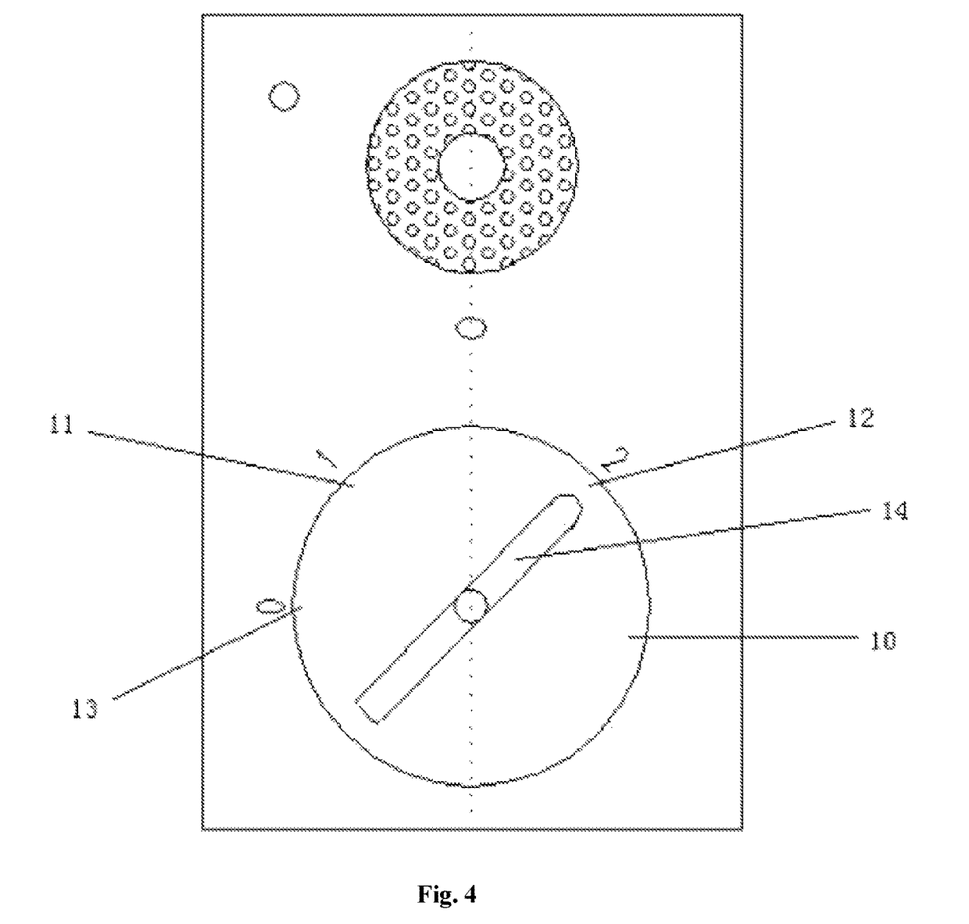
FIG. 4 is a state diagram when a control switch of an alarming and unlocking device in FIG. 1 is located at an unlocking position.
Figure 5:
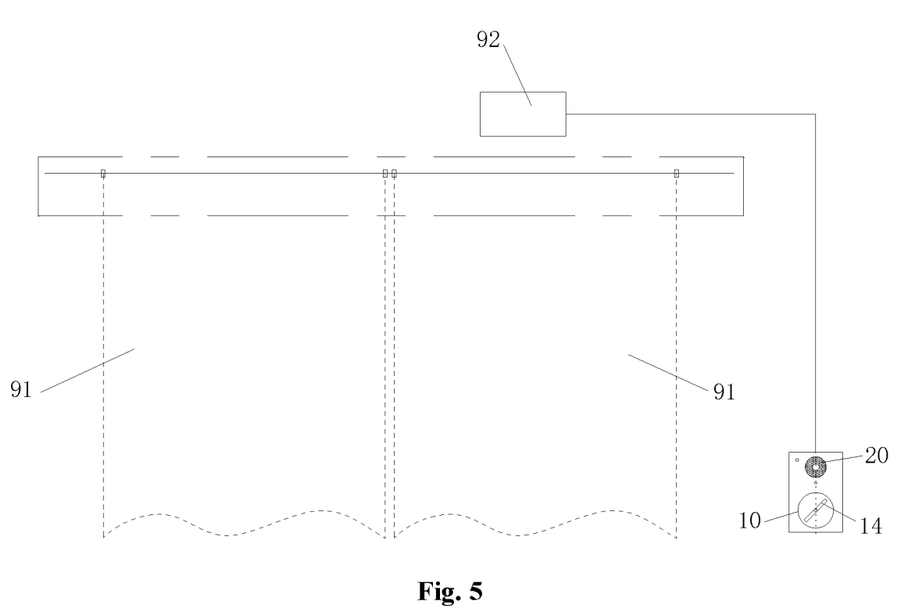
FIG. 5 is a structural schematic diagram of the locking device and door of the alarming and unlocking device in FIG. 1.

FIG. 3 and FIG. 4 both describe a state of a rotating position. The alarming position and the unlocking position have different angles, which mainly lies in that a mechanical signal is adopted at the unlocking position and there needs a long distance to trigger a steel wire rope to guarantee the transmission of the signal.

In the embodiment, the alarming and unlocking device further includes a power control module 60; the power control module 60 is connected with the communication device and is configured to supply a power to the communication device. Through the power control module 60, the communication device is controlled conveniently and is supplied with the power.

In the embodiment, the alarming and unlocking device further includes an indication device 70; the control switch 10 is in signal connection with the indication device 70; when the control switch 10 is located at the alarming position 11, the indication device 70 sends out an alarming indication. Preferably, the indication device 70 is an indication lamp. Through the indication device 70, the passenger carriage may be indicated that it is in an alarming state at this moment.

In addition, a time relay is arranged in the locking device; a set period of time is stored in the time relay; when the control switch 10 is located at the alarming position 11 till the period of set time, the locking device generates a door unlocking confirmation signal and sends the door unlocking confirmation signal to the driver's cab.

In the embodiment, the time relay is arranged in the locking device. When an operator screws the rotary knob 14 to the alarming position 11 till the set period of time without loosening the hand, the door unlocking confirmation signal is sent to the driver's cab. If the hand is loosened, the rotary knob 14 automatically returns to the reset position 13, the unlocking confirmation signal is not generated and only an emergency call is achieved. Preferably, the set period of time is 5 s.

In the embodiment, the alarming and unlocking device is provided with a white transparent protective cover. An explanatory note is provided on the protective cover, for example, "Please don't operate an emergency alarming and door unlocking device freely at a non-emergency situation, rotating the rotary knob to a first position (the alarming position) refers to communicate with the driver in an emergency, rotating to a second position (the unlocking position) is to open the door to unlock emergently and rotating to a zero position is to reset and end the operation". The protective cover protects the device and further has the effects of warning and introducing how to use.

In order to transfer audio data and supply the power, the alarming and unlocking device further includes a data and power interface 80.

In the embodiment, the alarming and unlocking device is an device having emergency alarming and unlocking functions. It is mainly applied to a metro project and also can be applied to low floors and other urban rail projects. It integrates with the functions of alarming and unlocking the door in the emergency situation. When a metro vehicle is running and there is an emergency situation or a sudden event in the passenger carriage, the passenger can rotate the rotary knob thereon to the alarming position and loosens the hand, the alarming signal is transferred to the driver's cab and after the driver receives the signal, the passenger may implement a conversation with the driver via a built-in type talkback device on the rotary knob.

Since the emergency alarming and emergency door unlocking functions are rarely used in fact during operation of the vehicle, the functions are integrated to one device to reduce the arrangement and functional interfaces for units in the carriage. Moreover, the device is simple in design and reliable in function.

Various operations will be described below in details.

1. Operation at the Alarming Position

In the embodiment, the alarming and unlocking device in the carriage is used by the passenger conveniently. It is integrated with the protective cover, the microphone, the loudspeaker, the indication lamp and the alarming and unlocking rotary knobs. The microphone is of an embedded capacitor (noiseless) sound pressure type. The microphone is compatible to other parts of the system and is provided with a pre-amplifier.

When there is the emergency situation or the sudden event in the carriage, the passenger can operate the device, rotates the switch to the alarming position and loosens the hand. The alarming indication lamp starts to flash and the flash frequency is 1 Hz. Furthermore, a corresponding state signal is output to request to perform a talkback conversion with the driver's cab. The driver at a master control side selects to receive the alarming request and finishes an emergency talkback function with the passenger in the carriage.

2. Operation at the Unlocking Position

When there is the emergency situation or the sudden event in the carriage and the door needs to be opened, the passenger can operate the device, and rotates the switch to the alarming position without loosening the hand to perform conversion confirmation with the driver. Wherein, regarding whether the hand is loosened or not, there is a signal from the locking device on the door to transfer to the driver's cab. When the magnetic steel contacts the magnetic induction switch, the signal is generated; meanwhile, the wire drawing tray component is also rotated. The steel wire rope of a wire drawing tray is connected with the locking device and the time relay is arranged in the locking device. On the premise of not loosening the hand, the door unlocking confirmation signal is sent to the driver's cab after 5 s; and if the hand is loosened, no signal is generated and only the emergency conversion can be achieved.

After the driver receives the signal, the door needs to be opened to finish the talkback confirmation. At this moment, the driver operates an unlocking signal transferred by the locking device and the door can be unlocked.

There occur the following situations when a train unlocks.

1. If a door system has the power and a zero-speed signal (speed≤5 km/h) is effective, an emergency unlocking signal is sent to the driver and a door controller; and after the driver confirms and agrees, the door may be opened and closed manually.

2. If the door system has the power and the zero-speed signal (speed>5 km/h) is ineffective, an emergency unlocking signal is sent to the driver and the door controller. If the driver agrees, the driver will implement an emergency brake. When the vehicle is stopped, a door motor brake is separated. At this moment, the door may be opened manually.

The above are only preferred embodiments of the disclosure and do not limit the disclosure. To a person skilled in the art, the disclosure may have various modification and changes. Any modification, equivalent replacement and improvement made within the spirits and principles of the disclosure should fall within a scope of protection of the disclosure.

What is claimed is:

1. An alarming and unlocking device, installed in a passenger carriage and comprising:
   a control switch, the control switch being provided with an alarming position and an unlocking position;
   a communication device, the control switch being in signal connection with the communication device, when the control switch is located at the alarming position, the communication device being started to receive and send a voice signal; and
   a locking device, the locking device being installed on a door so as to control the door to lock or unlock, wherein the control switch is in signal connection with the locking device; when the control switch is located at the unlocking position, the locking device performs an unlocking operation;
   wherein the control switch comprises a rotary knob; the rotary knob is moved rotationally to reach to the alarming position or the unlocking position.

2. The alarming and unlocking device as claimed in claim 1, wherein the communication device comprises:

a loudspeaker; the control switch is connected with the loudspeaker; when the control switch is located at the alarming position, the loudspeaker is started.

3. The alarming and unlocking device as claimed in claim 1, wherein the communication device further comprises:
a microphone; the control switch is connected with the microphone; when the control switch is located at the alarming position, the microphone is started.

4. The alarming and unlocking device as claimed in claim 1, wherein the control switch is further provided with a reset position; the alarming position is located between the reset position and the unlocking position.

5. The alarming and unlocking device as claimed in claim 4, wherein the alarming and unlocking device further comprises a magnetic induction switch configured to send an alarming signal; the control switch comprises magnetic steel configured to trigger the magnetic induction switch; after the magnetic steel triggers the magnetic induction switch, a circuit where the magnetic induction switch is located transfers the alarming signal to a driver's cab.

6. The alarming and unlocking device as claimed in claim 5, wherein the control switch further comprises a wire drawing tray component; the magnetic steel is arranged on the wire drawing tray component; the rotary knob is connected with the wire drawing tray component so as to drive the wire drawing tray component to rotate; when the rotary knob is rotated to the alarming position, the magnetic steel triggers the magnetic induction switch.

7. The alarming and unlocking device as claimed in claim 6, wherein the alarming and unlocking device further comprises a driving rope; the wire drawing tray component and the locking device are connected via the driving rope; when the rotary knob is rotated to the unlocking position, the driving rope drives the locking device to perform the unlocking operation.

8. The alarming and unlocking device as claimed in claim 1, wherein the alarming and unlocking device further comprises:
a power control module; the power control module is connected with the communication device and is configured to supply a power to the communication device.

9. The alarming and unlocking device as claimed in claim 1, wherein the alarming and unlocking device further comprises:
an indication device; the control switch is in signal connection with the indication device; when the control switch is located at the alarming position, the indication device sends out an alarming indication.

10. The alarming and unlocking device as claimed in claim 1, wherein the control switch is further provided with a reset position; the alarming position is located between the reset position and the unlocking position.

11. The alarming and unlocking device as claimed in claim 10, wherein a time relay is arranged in the locking device; a set period of time is stored in the time relay; when the control switch is located at the alarming position till the set period of time, the locking device generates a door unlocking confirmation signal and sends the door unlocking confirmation signal to the driver's cab.

12. An alarming and unlocking device, installed in a passenger carriage and comprising:
a control switch, the control switch being provided with an alarming position and an unlocking position;
a communication device, the control switch being in signal connection with the communication device, when the control switch is located at the alarming position, the communication device being started to receive and send a voice signal;
a locking device, the locking device being installed on a door so as to control the door to lock or unlock, wherein the control switch is in signal connection with the locking device;
when the control switch is located at the unlocking position, the locking device performs an unlocking operation;
wherein the alarming and unlocking device further comprises a magnetic induction switch configured to send an alarming signal; the control switch comprises magnetic steel configured to trigger the magnetic induction switch; after the magnetic steel triggers the magnetic induction switch, a circuit where the magnetic induction switch is located transfers the alarming signal to a driver's cab.

13. The alarming and unlocking device as claimed in claim 12, wherein the control switch comprises a rotary knob; the rotary knob is moved rotationally to reach to the alarming position or the unlocking position.

14. The alarming and unlocking device as claimed in claim 13, wherein the control switch further comprises a wire drawing tray component; the magnetic steel is arranged on the wire drawing tray component; the rotary knob is connected with the wire drawing tray component so as to drive the wire drawing tray component to rotate; when the rotary knob is rotated to the alarming position, the magnetic steel triggers the magnetic induction switch.

15. The alarming and unlocking device as claimed in claim 14, wherein the alarming and unlocking device further comprises a driving rope; the wire drawing tray component and the locking device are connected via the driving rope; when the rotary knob is rotated to the unlocking position, the driving rope drives the locking device to perform the unlocking operation.

16. The alarming and unlocking device as claimed in claim 12, wherein a time relay is arranged in the locking device; a set period of time is stored in the time relay; when the control switch is located at the alarming position till the set period of time, the locking device generates a door unlocking confirmation signal and sends the door unlocking confirmation signal to the driver's cab.

17. The alarming and unlocking device as claimed in claim 13, wherein a time relay is arranged in the locking device; a set period of time is stored in the time relay; when the control switch is located at the alarming position till the set period of time, the locking device generates a door unlocking confirmation signal and sends the door unlocking confirmation signal to the driver's cab.

18. The alarming and unlocking device as claimed in claim 14, wherein a time relay is arranged in the locking device; a set period of time is stored in the time relay; when the control switch is located at the alarming position till the set period of time, the locking device generates a door unlocking confirmation signal and sends the door unlocking confirmation signal to the driver's cab.

19. An alarming and unlocking device, installed in a passenger carriage and comprising:
a control switch, the control switch being provided with an alarming position and an unlocking position;
a communication device, the control switch being in signal connection with the communication device, when the control switch is located at the alarming position, the communication device being started to receive and send a voice signal;

a locking device, the locking device being installed on a door so as to control the door to lock or unlock, wherein the control switch is in signal connection with the locking device; when the control switch is located at the unlocking position, the locking device performs an unlocking operation;

wherein a time relay is arranged in the locking device; a set period of time is stored in the time relay; when the control switch is located at the alarming position till the set period of time, the locking device generates a door unlocking confirmation signal and sends the door unlocking confirmation signal to a driver's cab.

\* \* \* \* \*